Dec. 19, 1933.     E. V. TAYLOR     1,940,470
BRAKE MECHANISM
Filed July 26, 1930

INVENTOR.
EUGENE V. TAYLOR
BY *M.W.McConkey*
ATTORNEY

Patented Dec. 19, 1933

1,940,470

UNITED STATES PATENT OFFICE 1,940,470

BRAKE MECHANISM

Eugene V. Taylor, Chicago, Ill., assignor to Bendix Brake Company, South Bend, Ind., a corporation of Illinois Application July 26, 1930. Serial No. 470,794

4 Claims. (Cl. 188—79.5)

This invention relates to brakes and more particularly to internal expanding brakes.

It is well established that in brake structures, greater frictional output for a given pressure input is obtainable by the employment of a friction element of the band type, because of the utilization of practically the entire braking surface. However, in structures of this type, great difficulty has been encountered through the lack of proper adjustment means between the separable ends of the braking element and the operating member. The present invention aims to overcome this difficulty.

An object of the invention is to provide a friction element of the band type with adjustable shoulders on the respective separable ends of the element.

Another object of the invention is to provide the separable ends of a friction element with a stiffening means supporting adjustable shoulders.

Another object of the invention is to provide adjustable shoulders for the separable ends of a friction element and means associated therewith for retaining the shoulders in adjusted position.

An additional object of the invention is the provision of a friction element having adjustable shoulders on its separable ends of an exceedingly cheap and simple structure highly efficient in use, positive in action, durable in service and a general improvement in the art.

The above and other objects and features of the invention, including various novel details of structure, will be apparent from the following description of the illustrated embodiment shown in the accompanying drawing, in which.

Figure 1:
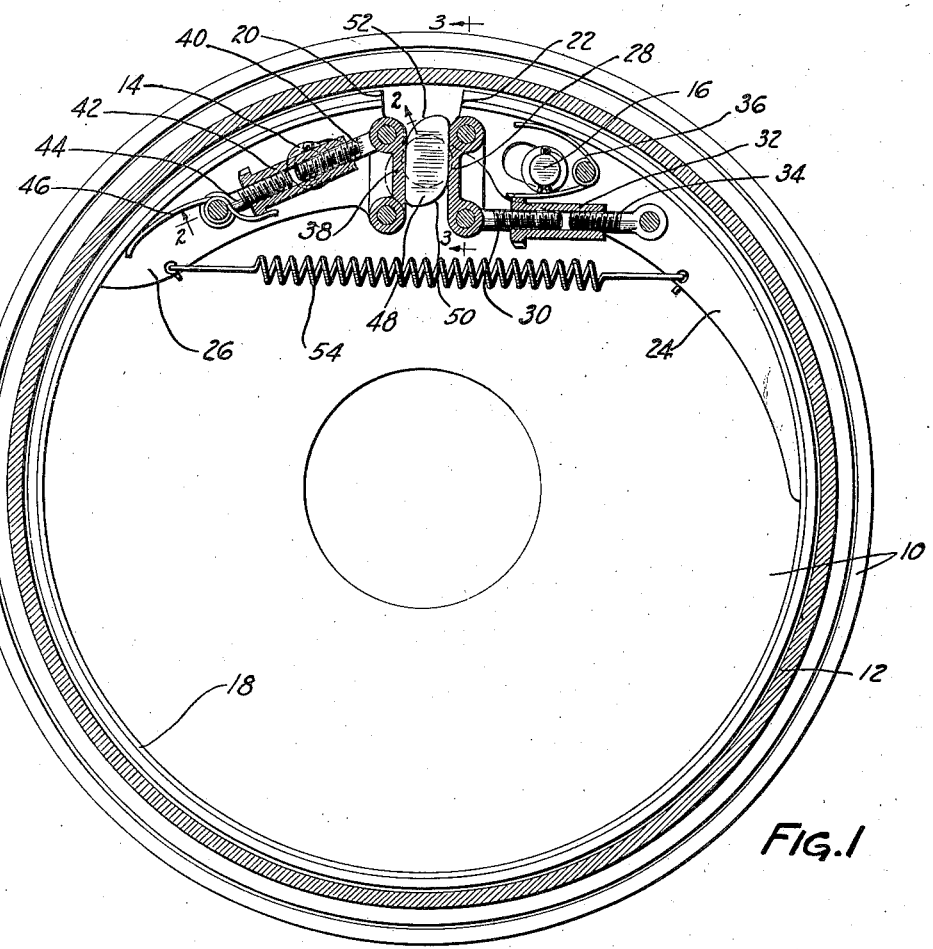
Figure 1 is a sectional view of a brake taken just back of the head of the drum illustrating an embodiment of the invention.
Figure 2:
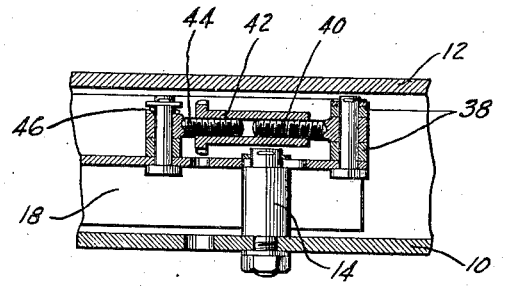
Figure 2 is a sectional view substantially on line 2—2, Figure 1.
Figure 3:
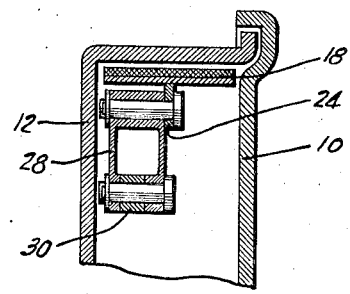
Figure 3 is a sectional view substantially on line 3—3, Figure 1.

Referring to the drawing for more specific details of the invention, 10 represents a fixed support, such as a backing plate having associated therewith a rotatable drum 12. Suitably positioned on the backing plate are anchors 14 and 16 and positioned for movement on the anchors is a friction element 18 of the band type having separable ends 20 and 22.

As shown, one end of the friction element 18 is provided with a web 24 which materially stiffens the band throughout a substantial radius and the other separable end of the friction element is provided with a web 26 of a relatively small radius. The webs 24 and 26 are slotted to receive the anchors 14 and 16.

Pivotally connected to the web 24 immediately adjacent the face of the friction element 18 by one end thereof is a thrust plate 28, to the other end of which is pivotally secured a screw 30 connected by a turnbuckle 32 to a screw 34 pivoted on the web 24. By manipulating the turnbuckle 32, the thrust plate 28 may be adjusted angularly with relation to the operating member to be hereinafter described. The turnbuckle is retained in adjusted position by a spring 36 engaging a ratchet thereon.

The web 26 has pivoted thereto at a point removed from the rim one end of a thrust plate 38, the other end of which is pivoted to a screw 40 connected by a turnbuckle 42 to a screw 44 pivoted on the web 26 adjacent the braking surface of the friction element 18. The turnbuckle is secured against displacement by a spring 46 engaging a ratchet thereon. This structure is such that the thrust plate 38 may be adjusted angularly with relation to the operating member and is movable in a reverse direction from the direction of movement of the thrust plate 28.

Positioned for rotation on the backing plate is an operating shaft 48 having oppositely disposed cam surfaces 50 and 52 adaptable for engagement with the thrust plates 28 and 38. By adjusting the turnbuckles 36 and 42, the relation of the thrust plates 28 and 38 with respect to the cam surfaces 50 and 52 may be regulated for proper operation of the brake. The friction element is retained with the thrust plates in engagement with the cam surfaces 50 and 52 by a suitable return spring 54 connected between the webs 24 and 26. Adjustment of the thrust plates may be so accomplished as to effectively adjust the braking element, or the friction element so that it may be applied to produce the greatest frictional output for a given pressure input and to insure a smooth operation of the brake.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A brake comprising a friction element having separable ends, thrust members pivoted to the separable ends and arranged for movement in opposite directions, turnbuckles connecting the thrust members to the friction element and means for locking the turnbuckles in adjusted position.

2. A brake comprising a friction element having separable ends, thrust members having their opposite ends pivoted to the separable ends and arranged for movement in opposite directions, turnbuckles connecting the other ends of the thrust members to the friction element and means for locking the turnbuckles against displacement.

3. A brake friction element having pivoted thereto a pair of pivotally-connected angularly-related members, one of which provides a generally radial thrust surface and the other of which is constructed and arranged to adjust the position of said thrust surface.

4. A brake friction element having pivoted thereto a pair of pivotally-connected angularly-related members, one of which is constructed and arranged to adjust the position of the other.

EUGENE V. TAYLOR.